United States Patent
Xie et al.

(10) Patent No.: US 10,849,093 B2
(45) Date of Patent: Nov. 24, 2020

(54) POSITIONING SYSTEM AND METHOD

(71) Applicant: Volvo Car Corporation, Gothenburg (SE)

(72) Inventors: Baojun Xie, Shanghai (CN); Feng Zhu, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/233,381

(22) Filed: Dec. 27, 2018

(65) Prior Publication Data
US 2019/0208493 A1 Jul. 4, 2019

(30) Foreign Application Priority Data
Dec. 29, 2017 (CN) .......................... 2017 1 1484170

(51) Int. Cl.
| | |
|---|---|
| *H04W 64/00* | (2009.01) |
| *G01S 19/07* | (2010.01) |
| *H04W 4/029* | (2018.01) |
| *G01C 21/32* | (2006.01) |
| *G01S 5/00* | (2006.01) |
| *G01S 19/48* | (2010.01) |
| *H04W 4/02* | (2018.01) |
| *G01S 19/43* | (2010.01) |

(52) U.S. Cl.
CPC .......... *H04W 64/003* (2013.01); *G01C 21/32* (2013.01); *G01S 5/0072* (2013.01); *G01S 19/07* (2013.01); *G01S 19/48* (2013.01); *H04W 4/023* (2013.01); *H04W 4/029* (2018.02); *G01S 19/43* (2013.01)

(58) Field of Classification Search
CPC ... H04W 64/003; H04W 4/029; H04W 4/023; G01C 21/32; G01S 19/48; G01S 5/0072; G01S 19/07; G01S 19/43; G01S 19/40
See application file for complete search history.

(56) References Cited

U.S. PATENT DOCUMENTS

| | | | |
|---|---|---|---|
| 9,020,755 B1 | 4/2015 | Gazit et al. | |
| 2006/0017611 A1 | 1/2006 | Hatch et al. | |
| 2018/0192233 A1* | 7/2018 | Del Regno | ........... H04W 64/00 |
| 2018/0364366 A1* | 12/2018 | Cvijetic | .................. G01S 19/47 |
| 2019/0154842 A1* | 5/2019 | Adachi | .................... G01S 19/44 |

OTHER PUBLICATIONS

May 21, 2019 European Search Report issue on International Application No. EP18214473.
Scott Stephenson; A fairy tale approach to cooperative vehicle positioning; Proceedings of the 2014 International Technical Meeting of the Institute of Navigation, San Diego,CA Jan. 27-29, 2014; pp. 431-440.

* cited by examiner

*Primary Examiner* — Nam T Huynh
(74) *Attorney, Agent, or Firm* — Clements Bernard Walker; Christopher L. Bernard

(57) ABSTRACT

A positioning system including an autonomous driving car used as a dynamic reference station to provide data required for Real-Time Kinematic (RTK) position correction; and a network server for receiving the data from the autonomous driving car to provide RTK position correction data to an end user. Further, a positioning method realized by this system is provided. This positioning system and methods are capable of considerably expanding the service range and significantly reducing the cost by utilizing an autonomous driving (AD) car for providing the data required for position correction.

8 Claims, 4 Drawing Sheets

POSITIONING SYSTEM AND METHOD

CROSS-REFERENCE TO RELATED APPLICATION

The present patent application/patent claims the benefit of priority of co-pending Chinese Patent Application No. CN201711484170.1, filed on Dec. 29, 2017, and entitled "A POSITIONING SYSTEM AND METHOD," the contents of which are incorporated in full by reference herein.

TECHNICAL FIELD

The present invention relates to a positioning system and method for use in the automotive field.

BACKGROUND

With the rapid development in satellite positioning technology, there is an increasing requirement for a quick and high accuracy positioning. At present, the high accuracy positioning technique used the most widely is RTK (Real-Time Kinematic), the key point of which lies in eliminating a majority of the errors in measurement data of a dynamic station by means of the differential method by using the carrier phase measurement of GPS and by utilizing the spatial correlation of the measurement error between the reference station and the dynamic station, thereby realizing a positioning with high accuracy (of decimeter level, even centimeter level), as shown in FIG. 1.

The biggest problem in the application of the RTK technique is that the effective action distance of the correction data of the reference station. The linearity of the spatial correlation of the GPS error gradually decreases as the distance between the reference station and the dynamic station increases. Thus, in case of long distance, the user data after differential processing still has a significant measurement error which leads to reduction in positioning accuracy and the non-computability of the ambiguity of whole cycles of the carrier phase. Therefore, for guaranteeing a satisfying positioning accuracy, the working range of the conventional stand-alone RTK is limited and can only cover about several kilometers.

For the purpose of overcoming the drawbacks in the traditional RTK technique, a network RTK technique was proposed in the middle of 1990s. In the network RTK technique, the single-point GPS error model with linear attenuation is replaced by the regional GPS network error model, that is, the GPS error model of one region is estimated by using a GPS network composed of a number of widely distributed fixed reference stations and the correction data is provided for the users in the region covered by the network, as shown in FIG. 2. The positioning data from the fixed reference station is communicated periodically to a center processing station. The center processing station calculates the correction information or correction position and then transmits it to an RTK user terminal.

However, such network RTK technique needs to employ a number of traditional static RTK reference stations each of which can only cover a certain range and is very costly. Moreover, a dedicated user terminal is needed, namely a RTK GPS receiver.

SUMMARY

To overcome at least one of the drawbacks in the prior technique, the invention provides a high accuracy positioning system and method with the cost reduced compared to the traditional network RTK technique.

According to one aspect, the present invention provides a positioning system comprising an autonomous driving (hereinafter, referred as AD) car used as a dynamic reference station to provide data required in RTK position correction, and a network server for receiving said data from the AD car to provide RTK position correction data for an end user.

The present invention is capable of considerably expanding the service area and significantly reducing the cost by utilizing the AD car to provide the data required in position correction.

Preferably, the data provided by the AD car is RTK position correction data.

Preferably, the AD car comprises a car positioner for determining the current position of car, and a GNSS receiver for receiving a signal from a satellite to determine a car satellite position, in which the data provided by the AD car is the current position of car and the car satellite position.

Preferably, the AD car compares the current position of car with the car satellite position by an RTK technique to determine RTK position correction data.

Preferably, said car positioner comprises a sensor for sensing surrounding road conditions of car and obtains the current position of car by matching road condition information with highly precise map data.

Preferably, said network server is a RTK cloud server.

Preferably, said network server fuses position correction data from one or more AD cars in order to achieve adjusted position correction data.

Preferably, the end user downloads the RTK position correction data from the network server by means of an APP installed in an electronic device.

Preferably, said positioning system is provided with the data required in RTK position correction only by the AD car.

According to another aspect, the present invention also provides a positioning method comprising obtaining the data required in RTK position correction from an AD car, and sending the data to a network server to provide RTK position correction data to an end user.

Preferably, the data obtained from the AD car is RTK position correction data.

Preferably, the AD car learns its current position by itself and receives a satellite signal to determine a satellite position.

Preferably, the AD car compares its current position with the satellite position by an RTK technique to provide RTK position correction data.

Preferably, the AD car obtains the current position of car by matching surrounding road conditions sensed by a senor with a highly precise map data.

Preferably, said network server is a RTK cloud server.

Preferably, said network server fuses position correction data from one or more AD cars in order to achieve adjusted position correction data.

Preferably, the end user downloads said RTK position correction data from the network server by means of an APP installed in an electronic device.

Preferably, said positioning method is provided with the data required in RTK position correction only by said AD car.

DESCRIPTION OF EMBODIMENTS

The high accuracy positioning system and method according to the present invention will be described in detail with reference to the drawings in the following.

The present invention use at least partially the AD (Autonomous Driving) cars to provide data required in RTK position correction or RTK position correction data itself and these data are provided to the network server in order to provide final RTK position correction data to the end user located within an effective distance. Thereby, this end user adjusts the current position depending on this RTK position correction data to realize the high accuracy positioning. The present invention can reduce considerably the cost by replacing at least parts of the static reference stations with AD cars.

The present invention may only utilize the AD car for providing the data required in RTK position correction, and preferably utilizes multiple AD cars to enlarge the range of the RTK positioning service.

The end user of the present invention may be not only an AD car, but also a non-AD car, as well as other common users. The end user only needs to install an APP in an electronic device such as an onboard navigation, a PND (Portal Navigation Device), a mobile intelligent watch, a portable phone, and the like to download correcting position information from the network server for correcting instead of a dedicated RTK terminal, thereby simplifying the operation and reducing the cost.

Figure 1:
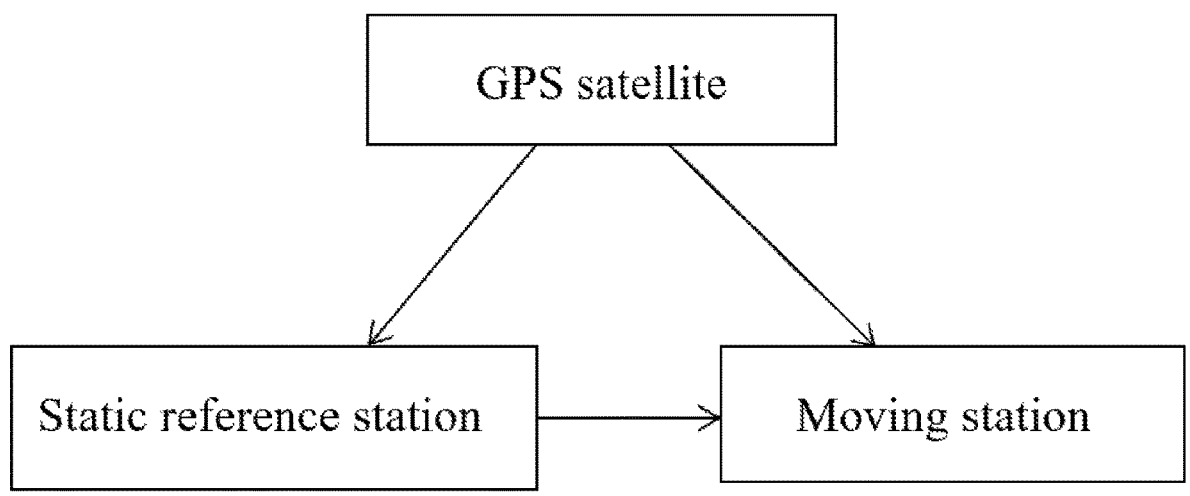
FIG. 1 is a schematic diagram of a traditional positioning system using stand-alone RTK technique.
Figure 2:
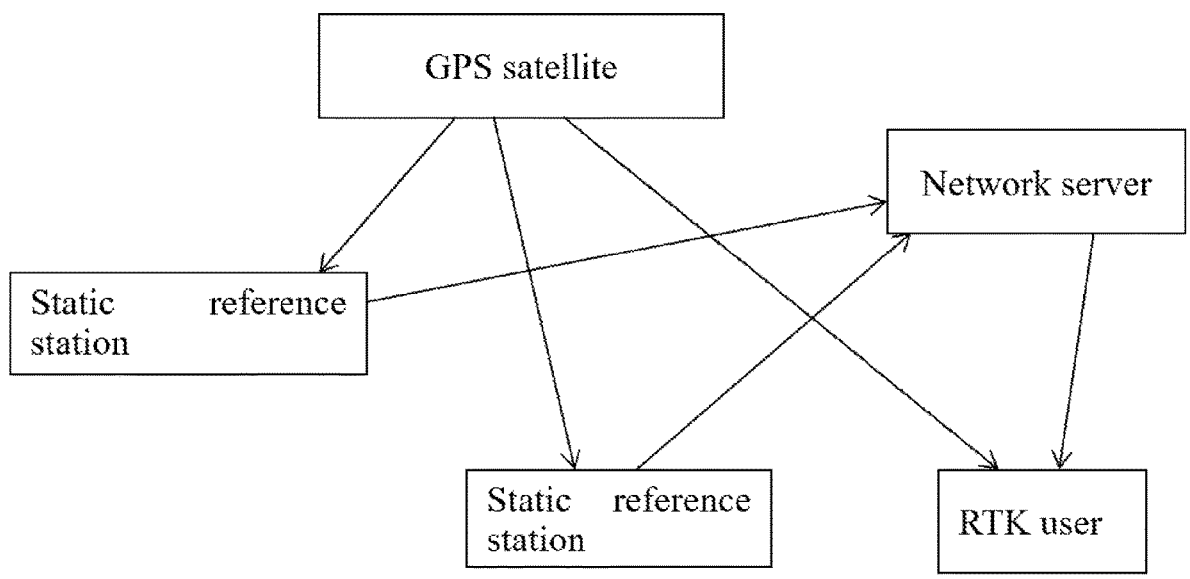
FIG. 2 is a schematic diagram of a traditional positioning system using network RTK technique.
Figure 3:
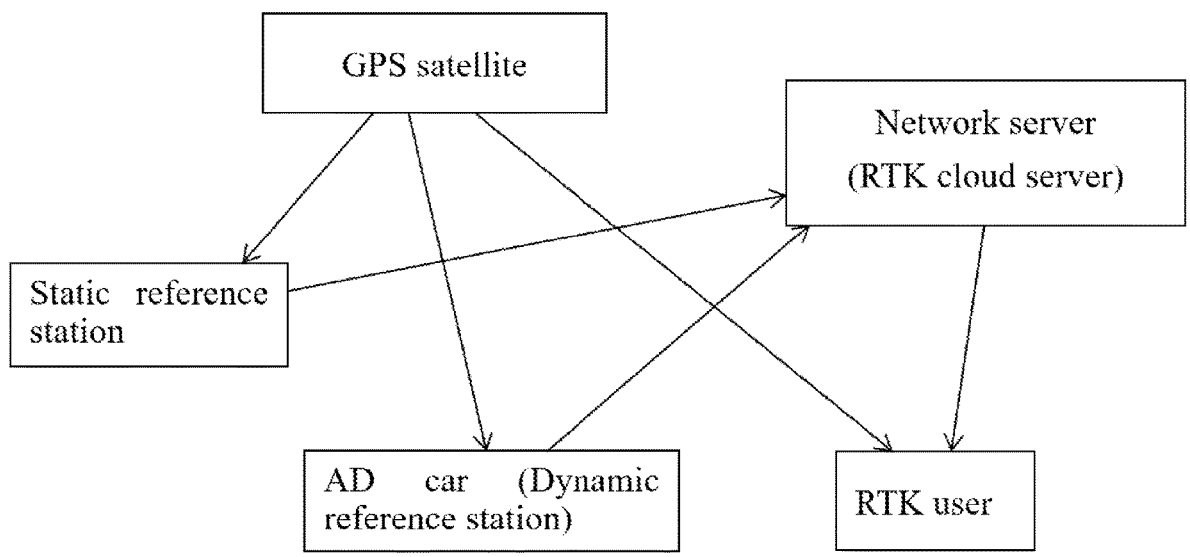
FIG. 3 is a schematic diagram of a positioning system using network RTK technique according to one embodiment of the present invention.

In one embodiment according to the present invention, as shown in FIG. 3, parts of the static reference stations in the prior technique is replaced with AD cars. Herein, the AD cars serve as dynamic reference stations. In case there are static reference stations in the positioning system, it is preferable to use the data therefrom. However, the data from AD cars can also be used.

The AD car can learn its own current position by a car body positioner. In one embodiment, the AD car achieves surrounding road conditions such as the information on road, traffic sign, obstacles and the like by mounting a sensor such as a camera, a laser radar and the like on itself, and performs the terrain matching between the surrounding road conditions achieved by the onboard terminal with highly precise map data such as a HAD (Highly Autonomous Driving) map or stream media data from the cloud to obtain its accurate absolute position (longitude and latitude), while the AD car further has an accurate time/timer.

Furthermore, the AD car is provided with a GNSS (Global Navigation Satellite System) receiver such as a GPS receiver for receiving information on satellite position determined by the satellite from the satellite. The AD car calculates RTK position correction data with the RTK technique by using the onboard terminal based on its accurate absolute position and the satellite position, and feedbacks this correction data (RTK correction parameters such as T, HAP, RTK parameters) to the network server by an transmitter.

The static reference station in the system also calculates and outputs RTK position correction data to the network server based on its own accurate position and the satellite position.

However, it can be conceived that it is also possible for the AD car and the static reference station not to perform any RTK calculation themselves, but to transmit the absolute position and the satellite position achieved by themselves to the network server in order that the network server performs the RTK calculation to obtain position correction data.

The network server receives data for RTK position correction or RTK position correction data itself from the static reference station and/or the AD car, and calculates or stores these data as needed, in order to release RTK parameters to end users. For the mass data sent by the AD car, taking into account the moving state of the AD car, especially in the case of data discontinuity, the positioning system can fuse these data based on the current RTK algorithm in view of the timeliness of data sent by one or more AD cars, data acquisition indicators and/or the maximum distance between each sending data and the maximum time interval, etc., so as to adjust RTK parameters to release the adjusted RTK parameters to the end user. Preferably, the network server is a RTK cloud server.

The end user can download these adjusted position correction data from the network server and may adjust the current GNSS position such as GPS position by using these correction data, thereby obtaining higher accuracy positioning. As described above, preferably, the end user may download correction data from the network server by installing an APP on an electronic device.

Since correction data of each static reference station and AD car can only cover a limited active area, multiple AD cars are used preferably for covering more RTK users. Since the AD cars are in a dynamic state, the deficiency that covering area of the traditional static reference is small can be overcome. As more and more AD cars join in this RTK network, the RTK service will cover more areas.

This positioning system can be applied to the car industry, surveying and mapping, consumer electronics and etc. That is, this positioning system may be used for not only the positioning of AD car or non-AD car, but also the occasion of the field operation, the positioning of other users and etc.

Figure 4:
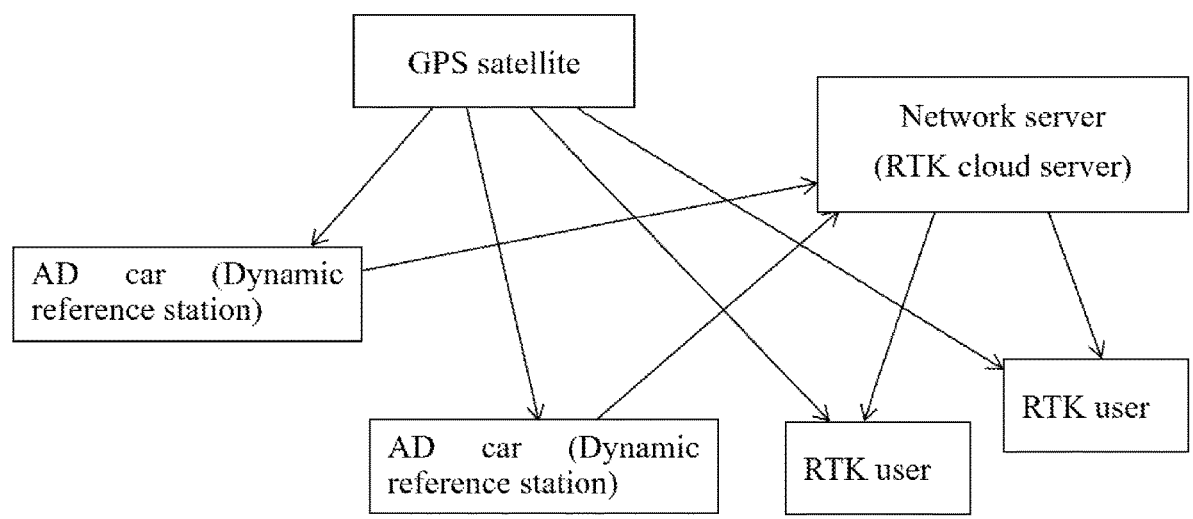
FIG. 4 is a schematic diagram of a positioning system using network RTK technique according to another embodiment of the present invention.

FIG. 4 illustrates a network RTK positioning system according to another embodiment of the present invention, and is different from the FIG. 3 in that all static reference stations are omitted. That is, in this embodiment, the data required in position correction of this system are entirely provided by the AD car. Therefore, the cost of the positioning system is further reduced and the coverage of the RTK positioning system is more flexible. The principle of sending data by AD car in this embodiment is the same as that shown in FIG. 3, and therefore is omitted here.

The positioning method employed in the positioning system of the present invention comprises obtaining data required in RTK position correction from an AD car and sending the data required in RTK position correction to a network server in order to provide final RTK position correction data to an end user within the effective range.

In one embodiment, obtaining data required in RTK position correction from the AD car includes the AD car providing the current position achieved by a car body positioner and the satellite position received from the satellite to the network server. Preferably, the AD car compares its current position with the satellite position by the use of RTK technique to provide RTK position correction data.

Wherein the car positioner senses the surrounding road conditions of the car such as information on road, traffic sign, obstacles and the like by mounting a sensor such as a camera, a laser radar and the like on itself, then the information is matched with highly precise map data such as a HAD (Highly Autonomous Driving) map or stream media data from the cloud to obtain the current position of the car.

In addition, the AD car is mounted with a GNSS (Global Navigation Satellite System) receiver such as a GPS receiver for receiving information on satellite position determined by the satellite from the satellite. The AD car calculates RTK position correction data by the use of RTK technique by using a processor based on its accurate absolute position and the satellite position, and feedbacks this correction data (RTK correction parameters such as T, HAP, RTK parameters) to the network server by an transmitter.

The network server receives RTK position correction data itself from the AD car and stores the data. The RTK parameters can be adjusted by fusing these correction data in order to publish the adjusted RTK parameters to the end user. Preferably, the network server is a RTK cloud server.

The end user can download the position correction data from the network server and may adjust the current GNSS position such as GPS position by using these correction data, thereby obtaining higher accuracy positioning. The end user can download RTK position correction data from the network server by installing an APP in an electronic device such as an onboard navigation, a PND (Portal Navigation Device), a mobile intelligent watch, a portable phone, and the like without employing a dedicated RTK terminal, thereby reducing the cost.

For expanding the RTK service range, the number of the AD car is preferably more than one, and the network server fuses position correction data from different AD cars to obtain adjusted position correction data.

This positioning method can be applied to the car industry, surveying and mapping, consumer electronics and etc. That is, this positioning system may be used for not only the positioning of the AD cars or non-AD cars, but also the occasion of the field operation, the positioning of other users and etc.

What is claimed is:

1. A positioning system, comprising:
    an autonomous driving car, which is used as a dynamic moving reference station to provide data required for Real-Time Kinematic (RTK) position correction; and
    a network server for receiving the data from the autonomous driving car to provide RTK position correction data to an end user; wherein the autonomous driving car comprises: a car positioner for determining a current position of car, and a Global Navigation Satellite System (GNSS) receiver for receiving a signal from a satellite to determine a car satellite position; wherein the data provided by the autonomous driving car is the current position of car and the car satellite position and one of the autonomous driving car and the network server compares the current position of car with the car satellite position by the use of an RTK technique to determine RTK position correction data provided to the end user, wherein the data provided by the autonomous driving car is fused with data required for RTK position correction from other autonomous driving cars at the network server before providing the RTK position correction data to the end user.

2. The positioning system according to claim 1, wherein the car positioner comprises a sensor for sensing surrounding road conditions of car and obtains the current position of car by matching road condition information from the sensor with highly precise map data.

3. The positioning system according to claim 1, wherein the network server is a RTK cloud server.

4. The positioning system according to claim 1, wherein the end user downloads the RTK position correction data from the network server by means of an APP installed on an electronic device.

5. A positioning method, comprising the following steps:
    obtaining data required for Real-Time Kinematic (RTK) position correction from an autonomous driving car used as a dynamic moving reference station; and sending the data to a network server to provide RTK position correction data to an end user;
    wherein the autonomous driving car comprises:
    a car positioner for determining a current position of car, and a Global Navigation Satellite System (GNSS) receiver for receiving a signal from a satellite to determine a car satellite position, wherein the data provided by the autonomous driving car is the current position of car and the car satellite position and one of the autonomous driving car and the network server compares the current position of car with the car satellite position by the use of an RTK technique to determine the RTK position correction data provided to the end user, wherein the data provided by the autonomous driving car is fused with data required for RTK position correction from other autonomous driving cars at the network server before providing the RTK position correction data to the end user.

6. The positioning method according to claim 5, wherein the autonomous driving car obtains the current position of car by matching surrounding road conditions sensed by a sensor with highly precise map data.

7. The positioning method according to claim 5, wherein the network server is a RTK cloud server.

8. The positioning method according to claim 5, wherein the end user downloads the RTK position correction data from the network server by means of an APP installed in an electronic device.

* * * * *